US011836495B2

(12) United States Patent
Yan et al.

(10) Patent No.: US 11,836,495 B2
(45) Date of Patent: Dec. 5, 2023

(54) METHOD OF IMPLEMENTING AN ARM64-BIT FLOATING POINT EMULATOR ON A LINUX SYSTEM

(71) Applicant: Airoha Technology (Suzhou) Limited, Suzhou (CN)

(72) Inventors: Fei Yan, Nanjing (CN); Peng Du, Nanjing (CN)

(73) Assignee: AIROHA TECHNOLOGY (SUZHOU) LIMITED, Suzhou (CN)

( * ) Notice: Subject to any disclaimer, the term of this patent is extended or adjusted under 35 U.S.C. 154(b) by 0 days.

(21) Appl. No.: 17/736,140

(22) Filed: May 4, 2022

(65) Prior Publication Data

US 2023/0176869 A1 Jun. 8, 2023

(30) Foreign Application Priority Data

Dec. 8, 2021 (TW) .................................. 110145792

(51) Int. Cl.
*G06F 9/30* (2018.01)
*G06F 9/455* (2018.01)

(52) U.S. Cl.
CPC .......... *G06F 9/3013* (2013.01); *G06F 9/3017* (2013.01); *G06F 9/30145* (2013.01); *G06F 9/455* (2013.01); *G06F 9/45516* (2013.01)

(58) Field of Classification Search
CPC .. G06F 9/3013; G06F 9/30145; G06F 9/3017; G06F 9/455; G06F 9/45516
See application file for complete search history.

(56) References Cited

U.S. PATENT DOCUMENTS

| | | | |
|---|---|---|---|
| 2012/0323552 A1* | 12/2012 | Lau ...................... | G06F 11/0772 703/26 |
| 2013/0305013 A1 | 11/2013 | Ebersole | |
| 2014/0188968 A1 | 7/2014 | Kaul et al. | |
| 2015/0277872 A1* | 10/2015 | Gschwind ........... | G06F 9/45516 717/153 |
| 2017/0097835 A1* | 4/2017 | Tzen ..................... | G06F 9/4484 |

OTHER PUBLICATIONS

Yoo et al.; Virtualizing ARM VFP (Vector Floating-Point) with Xen-ARM; 2012 (Year: 2012).*
You et al.; Translating AArch64 Floating-Point Instruction Set to the x86-64 Platform; ACM; Aug. 2019 (Year: 2019).*
Antras et al. (Low Overhead Dynamic Binary Translation on ARM; ACM; 2017 (Year: 2017).*

* cited by examiner

*Primary Examiner* — Corey S Faherty
(74) *Attorney, Agent, or Firm* — BACON & THOMAS, PLLC

(57) ABSTRACT

The present invention provides a method of implementing an ARM64-bit floating point emulator on a Linux system, which includes: running an ARM64-bit instruction on the Linux system; applying an instruction classifier to a first feature code of a machine code indicated by the ARM64-bit instruction to determine whether the ARM64-bit instruction is an ARM64-bit floating point instruction; and, if the ARM64-bit instruction is an ARM64-bit floating point instruction, applying the instruction classifier to a second feature code of the machine code indicated by the ARM64-bit instruction to determine the ARM64-bit floating point instruction to be a specific ARM64-bit floating point instruction.

10 Claims, 3 Drawing Sheets int fp_test(int y)

{float xx; xx = 10.327; return xx + y;}

Hexadecimal representation : 1e220000

Binary representation : 00011110001000100000000000000000

METHOD OF IMPLEMENTING AN ARM64-BIT FLOATING POINT EMULATOR ON A LINUX SYSTEM

CROSS REFERENCE TO RELATED APPLICATION

This application claims the benefits of the Taiwan Patent Application Serial Number 110145792, filed on Dec. 8, 2021, the subject matter of which is incorporated herein by reference.

BACKGROUND OF THE INVENTION

1. Field of the Invention

The present invention relates to a method of implementing an ARM64-bit floating point emulator on a Linux system.

2. Description of Related Art

Advanced RISC Machine (ARM) architecture is widely applied in embedded systems. ARM provides several supports for floating point computations as follows:

The first type of support is a floating point coprocessor implemented by hardware, wherein a compiler is used to compile codes directly into instructions that are recognizable by the floating point coprocessor. When executing such instructions, an ARM core directly passes them to the floating point coprocessor and they will be executed by the floating point coprocessor. The floating point coprocessor typically has a set of additional registers to perform parameter passing and computation for floating points. The newest ARM64-bit is a 64-bit extension of ARM architecture. To support a floating point computation of ARM64-bit, a floating point coprocessor is introduced, and a floating point instruction set is defined as well. However, in case a physical hardware is lacked, an instruction will be intercepted and will be executed instead by a floating point emulator.

The second type of support is a soft floating point library (or soft float library) implemented by software. The support from the soft float library is a function provided by a cross toolchain, and it is irrelevant to a Linux core. When the cross toolchain is used to compile a floating point operation, a compiler will replace the floating point operation with the inline soft float library, results in that although machine codes thereby generated do not have any floating point instruction, they can still correctly perform the floating point operation. However, known mainstream cross toolchains do not provide corresponding soft float library for ARM64-bit.

The third type of support is a floating point emulator implemented by software. In the past, ARM does not have a coprocessor, and a floating point computation is emulated by software via CPU, which is called the floating point emulator, and it is mainly implemented by an undefined instruction handler. However, it causes very frequent exceptions, and therefore significantly increases interruption delay, and decreases system real-time performance. Besides, known Linux cores do not support ARM64-bit floating point emulator.

At present, Linux only has an ARM32-bit floating point emulator, and does not have an ARM64-bit floating point emulator.

However, an embedded system generally has a requirement of a floating point computation, but since the known Linux cores do not support the ARM64-bit floating point emulator, an ARM64-bit floating point coprocessor can only run limited functions, and cannot perform the floating point computation. In this case, the ARM64-bit can only be downgraded as an ARM32-bit. Therefore, it is desirable to provide a method of implementing an ARM64-bit floating point computation on a Linux system, so as to solve the aforementioned problems.

SUMMARY OF THE INVENTION

In view of this, the present invention provides a method of implementing an ARM64-bit floating point emulator on a Linux system, including: running an ARM64-bit instruction on the Linux system; applying an instruction classifier to a first feature code of a machine code indicated by the ARM64-bit instruction to determine whether the ARM64-bit instruction is an ARM64-bit floating point instruction; and in response to an event in which the ARM64-bit instruction is an ARM64-bit floating point instruction, applying the instruction classifier to a second feature code of the machine code indicated by the ARM64-bit instruction to identify the ARM64-bit floating point instruction as a specific ARM64-bit floating point instruction.

Optionally, or preferably, the method includes: when the ARM64-bit instruction is an ARM64-bit floating point instruction, entering an ARM64-bit exception, wherein when entering the ARM64-bit exception, saving current conditions of the ARM64-bit exception and processing the ARM64-bit floating point instruction; and after completion of processing the ARM64-bit floating point instruction, exiting the ARM64-bit exception.

Optionally, or preferably, the processing the ARM64-bit floating point instruction further includes: defining a floating point register and a state structure, to store one or more data during a floating point computation for processing the ARM64-bit floating point instruction.

Optionally, or preferably, the instruction classifier is configured to perform a single-layer analysis or a layer-by-layer analysis according to a coding rule for floating point type instructions under ARM64-bit to determine a type of the ARM64-bit floating point instruction and a specific ARM64-bit floating point instruction.

Optionally, or preferably, the instruction classifier is configured to define the ARM64-bit floating point instruction in a 32 bits binary representation with an order from a most significant bit being a $31^{st}$ bit to a least significant bit being a $0^{th}$ bit.

Optionally, or preferably, the instruction classifier is configured to define the $31^{st}$ bit of the 32 bits binary representation as label "sf", a $29^{th}$ bit thereof as label "S", $22^{nd}$ to $23^{rd}$ bits as label "type", $19^{th}$ to $20^{th}$ bits as label "rmode", $16^{th}$ to $18^{th}$ bits as label "opcode", according to the coding rule for floating point type instructions under ARM64-bit, and determine the type of the ARM64-bit floating point instruction according to a value of each of "type", "rmode" or "opcode".

Optionally, or preferably, the ARM64-bit floating point instruction is classified as a conversion type instruction, a comparison type instruction or a computation type instruction.

Optionally, or preferably, the layer-by-layer analysis includes one classification in subsequent classifications to use the label "type" as the second feature code, and classify the ARM64-bit floating point instruction as a conversion type instruction, a comparison type instruction or a computation type instruction, based on the label "type".

Optionally, or preferably, the processing the ARM64-bit floating point instruction further includes: dispatching a corresponding floating point library function to perform the floating point computation for processing the ARM64-bit floating point instruction according to a type of the ARM64-bit floating point instruction and a specific ARM64-bit floating point instruction determined by the instruction classifier.

Optionally, or preferably, the method of implementing an ARM64-bit floating point emulator on a Linux system of the present invention further includes: after completion of processing the ARM64-bit floating point instruction, and before exiting the ARM64-bit exception, determining whether a next ARM64-bit instruction is another ARM64-bit floating point instruction; if the next ARM64-bit instruction is determined as another ARM64-bit floating point instruction, staying in the ARM64-bit exception, and processing the next ARM64-bit instruction; if the next ARM64-bit instruction is not determined as another ARM64-bit floating point instruction, exiting the ARM64-bit exception.

Other objects, advantages, and novel features of the invention will become more apparent from the following detailed description when taken in conjunction with the accompanying drawings.

BRIEF DESCRIPTION OF THE DRAWINGS

FIGS. 2(a), (b), (c) and (d) show a particular example of layer-by-layer classification performed by an instruction classifier of the present invention.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existent of another element described by a smaller ordinal number.

The terms "comprise", "include", "contain" and "have" means include but not limited thereto.

One existing implementation is to use a floating point coprocessor to determine whether an ARM64-bit instruction is an ARM64-bit floating point instruction, and perform a floating point computation after the ARM64-bit instruction is determined as an ARM64-bit floating point instruction. A system lacking a floating point coprocessor cannot perform such determination, and accordingly cannot perform such floating point computation. One possible alternative approach is to use a floating point emulator. However, Linux lacks a floating point emulator used in ARM architecture processor (such as ARM64-bit). Therefore, the present invention provides a method, which can perform emulation computation for floating points in the absence of the floating point coprocessor and a floating point emulator.

(Method of Implementing an ARM64-Bit Floating Point Emulator on a Linux System)

Figure 1:
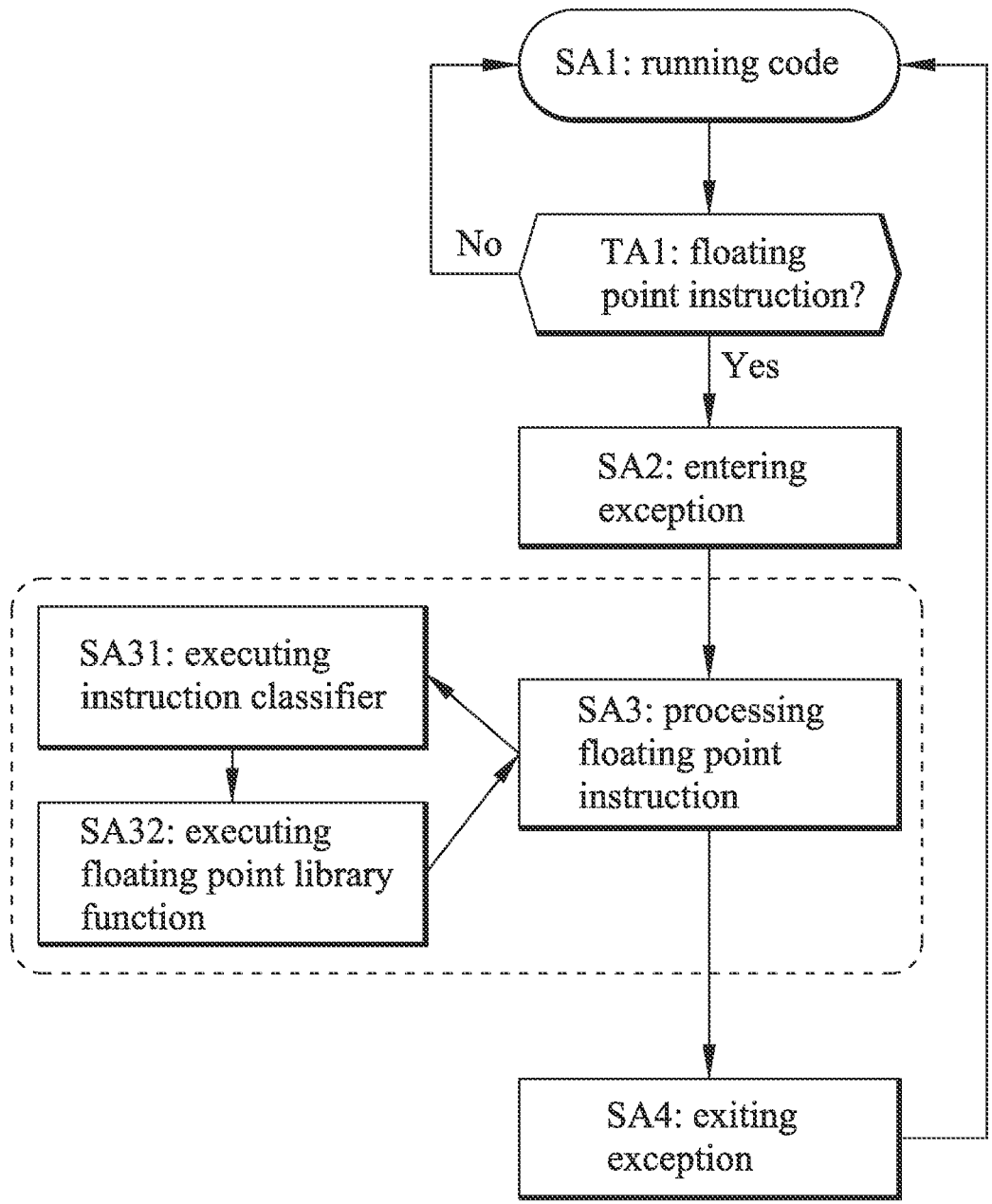
FIG. 1 is a flow chart of a method of implementing an ARM64-bit floating point emulator on a Linux system according to one embodiment of the present invention.

FIG. 1 is a flow chart of a method of implementing an ARM64-bit floating point emulator on a Linux system according to one embodiment of the present invention. The method of the present invention may be implemented by software, computer program, computer readable storage medium or computer program product. The method of the present invention includes following steps:

The method of the present invention starts from Step SA1: running a low-level code, for example, a machine code, on the Linux system. One machine code corresponds to one assembly code, and represents an ARM64-bit instruction. Machine codes are realized based on ARM coding rules, and are presented as: 1e220000, 52876c81, 72a824a1, 1e270021, 1e212800, 1e380000 and d65f03c0, for example. The aforementioned machine codes respectively correspond to assembly codes: scvtf, mov, movk, fmov, fadd, fcvtzs and ret, for example.

In a determination mechanism TA1, an instruction classifier is executed, and the instruction classifier is applied to the machine code. The instruction classifier is used to determine whether the ARM64-bit instruction indicated by the running machine code is an ARM64-bit floating point instruction. If the determination mechanism TA1 determines that the running ARM64-bit instruction is not an ARM64-bit floating point instruction, the method of present invention goes back to Step SA1 to continue executing a next ARM64-bit instruction. On the contrary, if the determination mechanism TA1 determines that the running ARM64-bit instruction is an ARM64-bit floating point instruction, the method of present invention has to save current conditions of the ARM64-bit exception, and then goes to Step SA2.

In Step SA2, an ARM64-bit exception is entered. It is noted that, there are several types of exceptions, and the present invention particularly concerns exceptions due to ARM64-bit "undefined instructions", because the present invention aims to solve the problem due to the known Linux cores that do not support ARM64-bit floating point emulator.

After Step SA2, it proceeds to Step SA3: processing the ARM64-bit floating point instruction. In Step SA3, a floating point register and a state structure are defined to save one or more data (for example, an intermediate result) during a floating point computation. Step SA3 may further include two Sub-steps SA31 and SA32.

In Step SA31, the instruction classifier is executed. The instruction classifier is configured to analyze the ARM64-bit floating point instruction, preferably to perform a layer-by-layer analysis according to a coding rule for floating point type instructions under ARM64-bit, to determine at first which type the ARM64-bit floating point instruction belongs to, and to determine then which specific ARM64-bit floating point instruction the ARM64-bit floating point instruction is.

In particular, each ARM64-bit instruction can correspond to a unique machine code. Through layer-by-layer matching by an instruction classifier, the ARM64-bit instruction can be identified for whether it is an ARM64-bit floating point instruction. Next, if the ARM64-bit instruction is identified as an ARM64-bit floating point instruction, since all ARM64-bit floating point instructions have corresponding types, the instruction classifier can classify the ARM64-bit instruction layer by layer according to the format of the coding rule; wherein there are several types of ARM64-bit floating point instruction including: the first type is "conversion type instruction", including interconversion between a floating point and a fixed point, interconversion between a floating point and an integer, but not limited thereto; the second type is "comparison type instruction", including comparison instruction and condition comparison instruction, but not limited thereto; the third type is "computation type instruction", including adding, subtracting, multiplying, dividing, multiplying-adding (that is, multiplying-adding means to perform multiplying before adding, for example, for four parameters, Rd, Rn, Rm and Ra; an instruction FMADD Rd, Rn, Rm, Ra means to perform a computation Rd=Ra+Rn*Rm), multiplying-subtracting (that is, multiplying-subtracting means to perform multiplying before subtracting, for example, for four parameters, Rd, Rn, Rm and Ra; an instruction FMSUB Rd, Rn, Rm, Ra means to perform a computation Rd=Ra−Rn*Rm), but not limited thereto. In this way, the instruction classifier can classify the ARM64-bit instruction, and match it to a unique specific ARM64-bit floating point instruction.

In Step SA32, a floating point library function is executed. Since each ARM64-bit floating point instruction is defined with a corresponding floating point library function, through the instruction classifier, different floating point library functions can be dispatched to perform emulation computation for ARM64-bit floating points according to different ARM64-bit instructions. For example, in order to perform floating point conversion, it needs to dispatch a floating point conversion function; in order to perform computation such as adding or subtracting of floating points, it needs to dispatch a floating point computation function. In the floating point computation, it possibly needs to obtain at first a plurality of intermediate results, then computing the intermediate results to obtain a final result, and the intermediate results may be saved in the floating point register, and they may be read from the floating point register when they need to join the computation.

The method returns from the floating point library function to Step SA3 after completion of processing the ARM64-bit floating point instruction. At the same time, if there is a final result, the final result is saved in a corresponding floating point register.

Then, the method proceeds to Step SA4: exiting the ARM64-bit exception, and at the same time restoring the aforementioned current conditions of the ARM64-bit exception saved when the determination mechanism TA1 detects the ARM64-bit exception, so as to continue running the assembly codes, that is, going back to Step SA1 to continue executing a next ARM64-bit instruction.

FIGS. 2(a), (b), (c) and (d) show a particular example of layer-by-layer classification performed by an instruction classifier of the present invention. The example of FIG. 2 is exemplary. The method of the present invention can be used to process other different ARM64-bit floating point instructions.

Firstly, FIG. 2(a) shows the content of C codes fp_test of the present example:
int fp_test(int_y)
{float xx; xx=10.327; return xx+y;}
The aforementioned C codes have the following meaning: a function fp_test is defined as an integer function, y is defined as an integer, xx is defined as a floating point and given with a value of 10.327, and a function fp_test is configured to perform adding computation of xx and y. Since xx is a floating point, the aforementioned computation is a floating point computation. The aforementioned codes are exemplary. After the C codes fp_test are inputted into a compiler, the compiler outputs seven ARM64-bit instructions as shown in FIG. 2(b), machine codes of the seven ARM64-bit instructions are 1e220000, 52876c81, 72a824a1, 1e270021, 1e212800, 1e380000 and d65f03c0, wherein for ease of reading, the machine codes are represented in hexadecimal system, but they are computed in binary system in fact.

Referring to FIG. 2(b), the machine codes of the aforementioned codes are shown, and there are seven ARM64-bit instructions, 1 e220000, 52876c81, 72a824a1, 1e270021, 1e212800, 1e380000 and d65f03c0 in total, wherein the machine code of the first ARM64-bit instruction is represented by a hexadecimal representation as 1e220000, and is represented as 00011110001000100000000000000000 in binary representation, which has 32 bits, defined with an order from a most significant bit (that is, the leftmost bit) being a $31^{st}$ bit to a least significant bit (that is, the rightmost bit) being a $0^{th}$ bit. For ease of explanation, the most significant bit can be indicated as Bit31, the second significant bit can be indicated as Bit30, the least significant bit can be indicated as Bit0, and so on. When a Linux operation system is run in an ARM64-bit processor, a code to be run is a machine code.

Secondly, FIG. 2(c) shows that the machine code of the first ARM64-bit instruction is represented as 00011110001000100000000000000000 in binary representation, and is analyzed by an instruction classifier of the present invention. The instruction classifier of the present invention is configured to define the $31^{st}$ bit as label "sf", a $29^{th}$ bit as label "S", $22^{nd}$ to $23^{rd}$ bits as label "type", $19^{th}$ to $20^{th}$ bits as label "rmode", $16^{th}$ to $18^{th}$ bits as label "opcode", $5^{th}$ to $9^{th}$ bits as label "Rn", and $0^{th}$ to $4^{th}$ bits as label "Rd", according to the coding rule for floating point type instructions under ARM64-bit, as shown in FIG. 2(c). A first ARM64-bit instruction can be classified according to the value of each of "sf", "S", "type", "rmode" and "opcode", and it can be further analyzed to identify which specific ARM64-bit floating point instruction the first ARM64-bit instruction is. In one embodiment, the instruction classifier determines whether an instruction is an ARM64-bit floating point instruction based on the values of the eight bits from the most significant bit (that is, Bit31, Bit30, Bit29, Bit28, Bit27, Bit26, Bit25 and Bit24), and machine code of the eight bits can be used as a first feature code. The eight bits are merely exemplary, and in other embodiments, other bits or other numbers of bits may be used to determine whether an ARM64-bit instruction is an ARM64-bit floating point instruction.

Finally, FIG. 2(d) shows that the machine code of the first ARM64-bit instruction is represented as 00011110001 00010000000000000000000 in binary representation, and is analyzed by the instruction classifier of the present invention.

After the first ARM64-bit instruction is determined as an ARM64-bit floating point instruction, a first classification is performed. In the present embodiment, the first classification is performed based on the label "type", that is, the values of Bit23 and Bit22, and the machine code of the two bits can be used as a second feature code. Using the label "type" to perform the first classification is merely exemplary, and in other embodiments, other labels may be used to perform the first classification. For example, the label "type" with a value of 00 indicates a "conversion type instruction", which is associated with conversion between a floating point and an integer. Conversion type instructions include floating point instructions such as scvtf, ucvtf, fcvtzs and fcvtzu in some embodiments. Subsequent classifications will be performed to determine that the ARM64-bit floating point instruction is which one of scvtf, ucvtf, fcvtzs and fcvtzu.

After the first classification is completed, it enters a second classification. In the present embodiment, the second classification is performed based on the label "rmode", that is, the values of Bit20 and Bit19. The machine code of the two bits can be used as a third feature code. Using the label "rmode" to perform the second classification is merely exemplary, and in other embodiments, other labels may be used to perform the second classification.

After the second classification is completed, a third classification is entered. In the present embodiment, the third classification is performed based on the label "opcode", that is, the values Bit18, Bit17 and Bit16. The machine code of the three bits can be used as a fourth feature code. Using the label "opcode" to perform the third classification is merely exemplary, and in other embodiments, other labels may be used to perform the third classification.

After the third classification is completed, the ARM64-bit floating point instruction is determined as a specific ARM64-bit floating point instruction, for example, the floating point instruction scvtf. This kind of layer-by-layer classification is helpful in accelerating the determination of the specific ARM64-bit floating point instruction.

In other embodiments, the layer-by-layer classification may be performed several times, for example, two times or more. It is also possible to consider determining the specific ARM64-bit floating point instruction simultaneously based on the labels "type", "rmode", "opcode" but without the layer-by-layer classification.

In the embodiment of FIG. 2(d), according to the coding rule for floating point type instructions under ARM64-bit, it is obtained that the value of "sf" is 0, the value of "S" is 0, the value of "type" is 00, the value of "rmode" is 00, and the value of "opcode" is 010, and then, a specific ARM64-bit floating point instruction is determined according to the values of the various labels in accordance with the aforementioned classification. As a result, the ARM64-bit instruction is determined as the "conversion type instruction", which is associated with conversion between a floating point and an integer, and the specific ARM64-bit floating point instruction is scvtf. Herein, scvtf(scalar, integer) is to convert a 32 bit integer "integer" into a single precision floating point "scalar".

After the first ARM64-bit instruction is determined as the "conversion type instruction" and the specific ARM64-bit floating point instruction is determined as scvtf, a corresponding floating point library function int_to_float( ) is dispatched to perform an emulation computation for the ARM64-bit floating point, wherein the function int_to_float( ) functions to convert an integer into a floating point.

The aforementioned description is made to explain the analysis and process for the machine code 1e220000 indicated by the first ARM64-bit instruction in FIG. 2(b). However, for example, a similar analysis and process may be performed for a machine code 1e212800 indicated by the fifth ARM64-bit instruction in FIG. 2(b), as explained in the following description.

In a similar way, the machine code 1e212800 of the fifth ARM64-bit instruction is represented by a binary representation as 00011110001000010010100000000000, and is analyzed by the instruction classifier of the present invention. According to the coding rule for floating point type instructions under ARM64-bit, it is obtained that the value of "sf" is 0, the value of "S" is 0, the value of "type" is 00, the value of "rmode" is 00, and the value of "opcode" is 001, and then, a specific ARM64-bit floating point instruction is determined according to the values of the various labels in accordance with the aforementioned classification. As a result, the fifth ARM64-bit instruction is determined as the "computation type instruction", which is associated with adding two floating points, and the specific ARM64-bit floating point instruction is fadd, and a corresponding floating point library function float_add( ) is dispatched to perform an emulation computation for the ARM64-bit floating point, wherein the function float_add( ) functions to add two floating points.

Other ARM64-bit floating point instructions may be classified and processed in similar ways.

(SEMI-Based Optimization Method for ARM64-Bit Floating Point Emulator)

Figure 3:
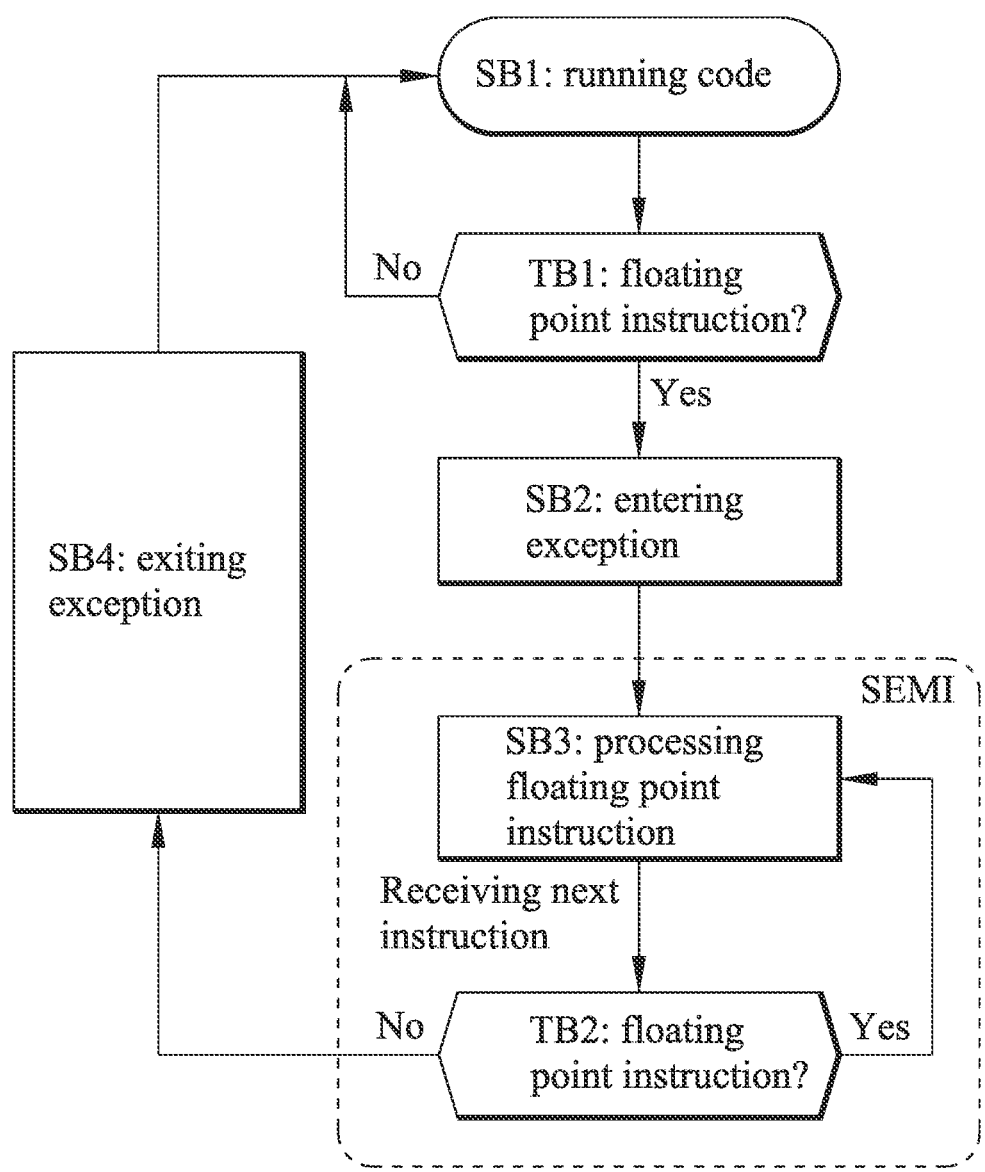
FIG. 3 is a flow chart of a SEMI-based optimization method for an ARM64-bit floating point emulator according to another embodiment of the present invention.

FIG. 3 is a flow chart of a single exception for multiple instructions (SEMI)-based optimization method for an ARM64-bit floating point emulator according to another embodiment of the present invention.

Single exception for multiple instructions (SEMI) refers to processing multiple ARM64-bit floating point instructions in a single exception. For subsequent ARM64-bit floating point instructions, using SEMI can reduce the time cost due to entering multiple exceptions. Quantitatively say, when confronting with an ARM64-bit floating point instruction, an overall time is defined from entering an exception, through performing an emulation computation for the ARM64-bit floating point instruction, up to exiting the exception, wherein the time cost of entering the exception and exiting the exception occupies 10% of the overall time, and the emulation computation itself occupies 90% of the overall time. Therefore, it demonstrates that using SEMI can reduce the time cost to nearly 10% of the overall time.

The SEMI-based optimization method for ARM64-bit floating point emulator of the present invention may be implemented by software, computer program, computer readable storage medium or computer program product. The method of the present invention includes the following steps:

The method of the present invention starts from Step SB1: running a low-level code, for example, a machine code, on a Linux system. Step SB1 is similar to Step SA1 in FIG. 1, so the details are omitted here.

A determination mechanism TB1 is used to determine whether the ARM64-bit instruction indicated by the running machine code is an ARM64-bit floating point instruction. If the determination mechanism TB1 determines that the running ARM64-bit instruction is not an ARM64-bit floating point instruction, the method of present invention goes back to Step SB1 to continue executing a next ARM64-bit instruction. On the contrary, if the determination mechanism TB1 determines that the running ARM64-bit instruction is an ARM64-bit floating point instruction, the method of present invention has to save current conditions of the ARM64-bit exception, and then goes to Step SB2. In Step SB2, an ARM64-bit exception is entered.

After Step SB2, it proceeds to Step SB3: processing the ARM64-bit floating point instruction. In Step SB3, a floating point register and a state structure are defined to save data (for example, an intermediate result) during a floating point computation. Step SB3 may further include two sub-steps: executing an instruction classifier, and executing a floating point library function. The execution of the instruction classifier may be referred to the relevant description for Step SA31 in the embodiment of FIG. 2, and the execution of the floating point library function may be referred to the relevant description for Step SA32 in the embodiment of FIG. 2, so the details are omitted here. The method returns from the floating point library function to Step SB3 after completion of processing the ARM64-bit floating point instruction. At the same time, if there is a final result, the final result is saved in a corresponding floating point register.

A determination mechanism TB2 is used to determine whether a next ARM64-bit instruction is still an ARM64-bit floating point instruction. The determination may be referred to the relevant description for Step SA31 in the embodiment of FIG. 2, which is done by performing a layer-by-layer analysis by an instruction classifier of the present invention according to a coding rule for floating point type instructions under ARM64-bit, so as to rapidly determine whether the next ARM64-bit instruction is still an ARM64-bit floating point instruction. If the determination mechanism TB2 determines that the next ARM64-bit instruction is still an ARM64-bit floating point instruction, there is no need to exit the ARM64-bit exception. The next ARM64-bit instruction can be sent to and processed by Step SB3, and this is called the SEMI mechanism, which can reduce the time cost due to entering multiple exceptions. On the contrary, if the determination mechanism TB2 determines that the next ARM64-bit instruction is not an ARM64-bit floating point instruction, it enters Step SB4. For example, referring back to FIG. 2(b), after a corresponding floating point library function is dispatched to the fourth machine code 1e270021, a ARM64-bit instruction (that is, the fifth machine code 1e212800) immediately subsequent to the fourth machine code 1e270021 is also an ARM64-bit floating point instruction, so there is no need to exit the ARM64-bit exception, and the next ARM64-bit instruction can be sent to and processed by Step SB3.

In Step SB4, the ARM64-bit exception is exited, and at the same time restoring the aforementioned current conditions of the ARM64-bit exception saved when the determination mechanism TB1 detects the ARM64-bit exception, so as to continue running the code, that is, going back to Step SB1 to continue executing a next ARM64-bit instruction. It should be noted that, the next ARM64-bit instruction here is not an ARM64-bit floating point instruction, because a subsequent ARM64-bit floating point instruction should be subsequently processed by the SEMI mechanism.

In conclusion, the present invention provides a method of implementing an ARM64-bit floating point emulator on a Linux system. In addition, the present invention further provides a SEMI-based optimization method for an ARM64-bit floating point emulator, which can avoid frequent exceptions, significantly reduces interruption delay, and improve system real-time performance.

Although the present invention has been explained in relation to its preferred embodiment, it is to be understood that many other possible modifications and variations can be made without departing from the spirit and scope of the invention as hereinafter claimed.

What is claimed is:

1. A method of implementing an ARM64-bit floating point emulator on a Linux system, comprising:
running an ARM64-bit instruction on the Linux system;
applying an instruction classifier to a first feature code of a machine code indicated by the ARM64-bit instruction to determine whether the ARM64-bit instruction is an ARM64-bit floating point instruction; and
in response to an event in which the ARM64-bit instruction is an ARM64-bit floating point instruction, applying the instruction classifier to a second feature code of the machine code indicated by the ARM64-bit instruction to identify the ARM64-bit floating instruction as a specific ARM64-bit floating instruction.

2. The method of implementing an ARM64-bit floating point emulator on a Linux system of claim 1, comprising:
when the ARM64-bit instruction is an ARM64-bit floating point instruction, entering an ARM64-bit exception, wherein when entering the ARM64-bit exception, saving current conditions of the ARM64-bit exception and processing the ARM64-bit floating point instruction; and
after completion of processing the ARM64-bit floating point instruction, exiting the ARM64-bit exception.

3. The method of implementing an ARM64-bit floating point emulator on a Linux system of claim 2, wherein the processing the ARM64-bit floating point instruction further comprises:
defining a floating point register and a state structure to store one or more data during a floating point computation for processing the ARM64-bit floating point instruction.

4. The method of implementing an ARM64-bit floating point emulator on a Linux system of claim 1, wherein the instruction classifier is configured to perform a single-layer analysis or a layer-by-layer analysis according to a coding rule for floating point type instructions under ARM64-bit to determine a type of the ARM64-bit floating point instruction and a specific ARM64-bit floating point instruction.

5. The method of implementing an ARM64-bit floating point emulator on a Linux system of claim 4, wherein the instruction classifier is configured to define the ARM64-bit floating point instruction in a 32 bits binary representation with an order from a most significant bit being a $31^{st}$ bit to a least significant bit being a $0^{th}$ bit.

6. The method of implementing an ARM64-bit floating point emulator on a Linux system of claim 5, wherein the instruction classifier is configured to define the $31^{st}$ bit of the 32 bits binary representation as label "sf", a $29^{th}$ bit thereof as label "S", $22^{nd}$ to $23^{rd}$ bits as label "type", $19^{th}$ to $20^{th}$ bits as label "rmode", $16^{th}$ to $18^{th}$ bits as label "opcode", according to the coding rule for floating point type instructions under ARM64-bit, and determine the type of the ARM64-bit floating point instruction according to a value of each of "type", "rmode" or "opcode".

7. The method of implementing an ARM64-bit floating point emulator on a Linux system of claim 6, wherein the ARM64-bit floating point instruction is classified as a conversion type instruction, a comparison type instruction or a computation type instruction.

8. The method of implementing an ARM64-bit floating point emulator on a Linux system of claim 6, wherein the layer-by-layer analysis includes one classification in subsequent classifications to use the label "type" as the second feature code, and classify the ARM64-bit floating point instruction as a conversion type instruction, a comparison type instruction or a computation type instruction, based on the label "type".

9. The method of implementing an ARM64-bit floating point emulator on a Linux system of claim 2, wherein the processing the ARM64-bit floating point instruction further comprises:
- dispatching a corresponding floating point library function to perform floating point computation for processing the ARM64-bit floating point instruction according to a type of the ARM64-bit floating point instruction and a specific ARM64-bit floating point instruction determined by the instruction classifier.

10. The method of implementing an ARM64-bit floating point emulator on a Linux system of claim 1, further comprising:
- after completion of processing the ARM64-bit floating point instruction and before exiting the ARM64-bit exception, determining whether a next ARM64-bit instruction is another ARM64-bit floating point instruction;
- if the next ARM64-bit instruction is determined as another ARM64-bit floating point instruction, staying in the ARM64-bit exception, and processing the next ARM64-bit instruction; and
- if the next ARM64-bit instruction is not determined as another ARM64-bit floating point instruction, exiting the ARM64-bit exception.

* * * * *